United States Patent
Amthor et al.

(10) Patent No.: US 11,508,045 B1
(45) Date of Patent: Nov. 22, 2022

(54) MICROSCOPY SYSTEM AND METHOD FOR GENERATING STYLIZED CONTRAST IMAGES

(71) Applicant: Carl Zeiss Microscopy GmbH, Jena (DE)

(72) Inventors: Manuel Amthor, Jena (DE); Daniel Haase, Zoellnitz (DE); Alexander Freytag, Erfurt (DE); Christian Kungel, Penzberg (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 17/824,833

(22) Filed: May 25, 2022

(30) Foreign Application Priority Data

Jun. 2, 2021 (DE) .................. 10 2021 114 287.3

(51) Int. Cl.
*G06T 5/00* (2006.01)
*G06T 3/40* (2006.01)

(52) U.S. Cl.
CPC ............. *G06T 5/007* (2013.01); *G06T 3/40* (2013.01); *G06T 5/002* (2013.01); *G06T 5/003* (2013.01); *G06T 2207/10024* (2013.01); *G06T 2207/10056* (2013.01); *G06T 2207/20081* (2013.01); *G06T 2207/20084* (2013.01)

(58) Field of Classification Search
CPC .......... G06T 5/007; G06T 3/40; G06T 5/002; G06T 5/003; G06T 2207/10024; G06T 2207/10056; G06T 2207/20081; G06T 2207/20084
See application file for complete search history.

(56) References Cited

U.S. PATENT DOCUMENTS

| 9,786,050 | B2 | 10/2017 | Bhargava |
| 10,013,760 | B2 | 7/2018 | Bhargava |
| 11,222,415 | B2 * | 1/2022 | Ozcan ............... G06T 3/4053 |

(Continued)

FOREIGN PATENT DOCUMENTS

| DE | 102020105697 B3 | 3/2021 |
| EP | 3553165 A1 | 10/2019 |

(Continued)

OTHER PUBLICATIONS

Search Report for DE102021114287.3, dated Jan. 17, 2022, 7 pages (with nglish translation).

(Continued)

*Primary Examiner* — Phuoc Tran
(74) *Attorney, Agent, or Firm* — LaBatt, LLC (57) ABSTRACT

In a computer-implemented method for generating an image processing model that generates output data defining a stylized contrast image from a microscope image, model parameters of the image processing model are adjusted by optimizing at least one objective function using training data. The training data comprises microscope images as input data and contrast images, wherein the microscope images and the contrast images are generated by different microscopy techniques. In order for the output data to define a stylized contrast image, the objective function forces a detail reduction or the contrast images are detail-reduced contrast images with a level of detail that is lower than in the microscope images and higher than in binary images.

14 Claims, 7 Drawing Sheets

(56) References Cited

U.S. PATENT DOCUMENTS

| | | | |
|---|---|---|---|
| 2019/0384047 A1* | 12/2019 | Johnson | A61B 5/0275 |
| 2020/0386978 A1 | 12/2020 | Lee et al. | |
| 2021/0279875 A1 | 9/2021 | Saur et al. | |
| 2022/0156561 A1* | 5/2022 | Hong | G06V 20/698 |

FOREIGN PATENT DOCUMENTS

| | | |
|---|---|---|
| WO | 2019160580 A1 | 8/2019 |
| WO | 2019172901 A1 | 9/2019 |
| WO | 2020018154 A1 | 1/2020 |

OTHER PUBLICATIONS

Christiansen, Eric, et al., "In Silico Labeling: Predicting Fluorescent Labels in Unlabeled Images," 2018, Cell 173, 792-803, 803.e1-e19, Apr. 19, 2018, Elsevier, doi: https://doi.org/10.1016/j.cell.2018.03.040.

Ounkomol, Chawin, et al., "Label-free prediction of three-dimensional fluorescence images from transmitted light microscopy", bioRxiv preprint, May 23, 2018, https://doi.org/10.1101/289504.

Alvarenga, Lauren, Olympus Discovery Blog, Sep. 2, 2020, "A Video Introduction to Label-Free Nucleus Detection with TruAI Technology", https://www.olympus-lifescience.com/en/discovery/a-video-introduction-to-label-free-nucleus-detection-with-truai-technology/, 2 pages.

Ronneberger, Olaf, et al., "U-Net: Convolutional Networks for Biomedical Image Segmentation", arXiv:1505.04597v1, May 18, 2015, 8 pages.

Gatys, Leon A., et al., "Image Style Transfer Using Convolutional Neural Networks", Proceedings of the IEEE Conference on Computer Vision and Pattern Recognition (CVPR), 2016, pp. 2414-2423.

Isola, Phillip, et al., "Image-to-Image Translation with Conditional Adversarial Networks", arXiv:1611.07004v3 [cs.CV] Nov. 26, 2018, downloaded from https://arxiv.org/pdf/1611.07004.pdf, 17 pages.

Zhu, Jun-Yan, et al. "Unpaired Image-to-Image Translation using Cycle-Consistent Adversarial Networks", arXiv:1703 10593v7, Aug. 24, 2020, downloaded from https://arxiv.org/pdf/1703.10593.pdf, 18 pages.

* cited by examiner

MICROSCOPY SYSTEM AND METHOD FOR GENERATING STYLIZED CONTRAST IMAGES

REFERENCE TO RELATED APPLICATIONS

The current application claims the benefit of German Patent Application No. 10 2021 114 287.3, filed on 2 Jun. 2021, which is hereby incorporated by reference.

FIELD OF THE DISCLOSURE

The present disclosure relates to a microscopy system and to a computer-implemented method for generating an image processing model that generates output data defining a stylized contrast image from a microscope image. The disclosure also relates to a computer-implemented method for generating a stylized contrast image from a microscope image by means of the image processing model.

BACKGROUND OF THE DISCLOSURE

Figure 1:
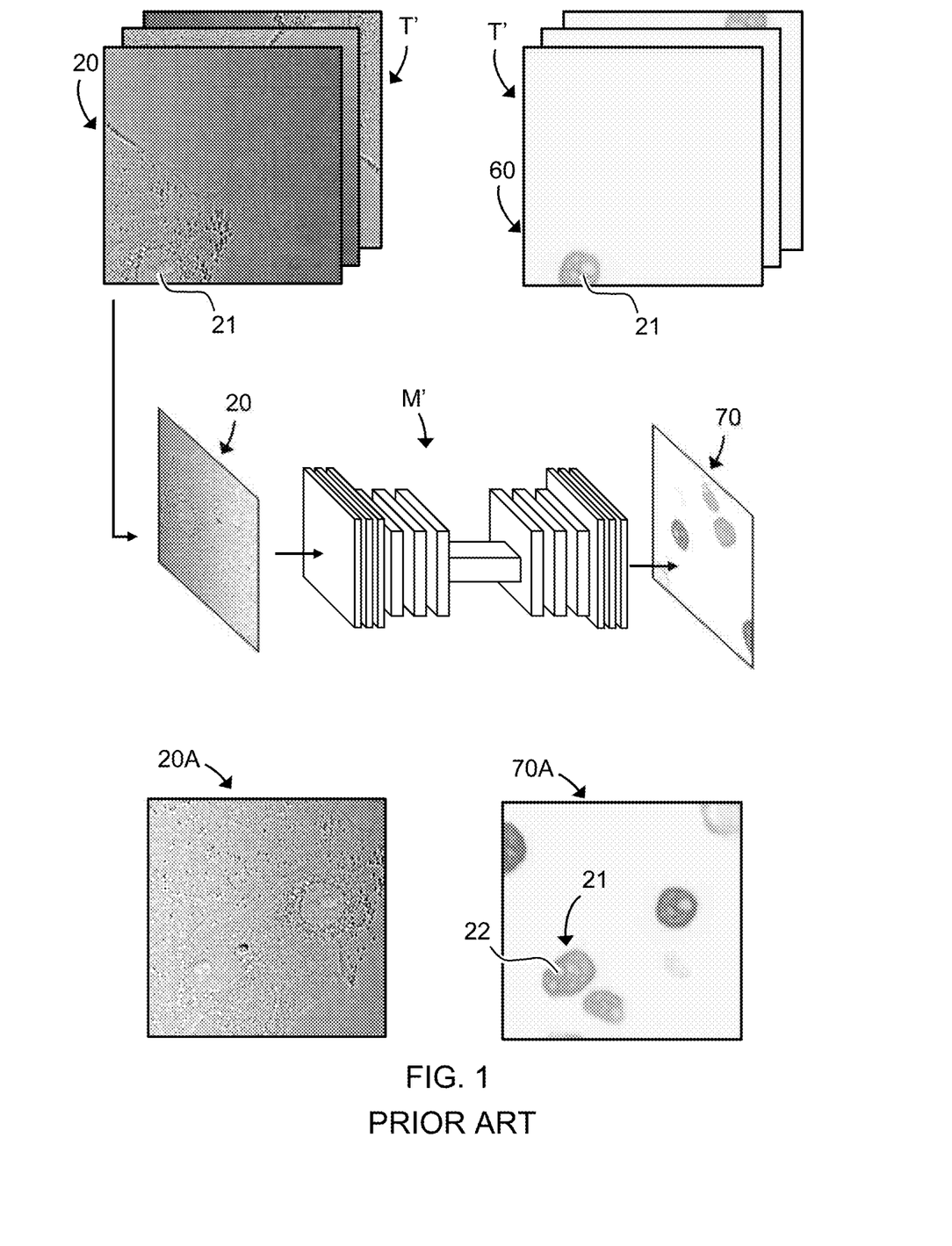
FIG. 1 is a schematic illustration of a method for generating virtually stained images according to the prior art.

An automatic processing of captured images is playing an increasingly important role in modern microscopy systems. A case in point is virtual staining, by means of which certain sample structures are localized and highlighted, i.e. depicted in a manner that enhances their distinguishability. This is typically brought about by means of machine-learned models using training data, as described in greater detail with reference to FIG. 1. FIG. 1 shows a plurality of microscope images 20 captured using a certain contrast method (e.g., in the form of phase-contrast images). In the illustrated case, associated fluorescence images, which are an example of general contrast images 60, have been captured with a microscope. Contrast images 60 are to be understood in the present disclosure as images captured with a different contrast method than microscope images 20. A sample structure 21, e.g. a biological cell, can only be distinguished with difficulty in the microscope image 20, while in the contrast image 60 the sample structure 21 stands out more clearly from a remaining image background. For example, in a fluorescence image, it is possible to capture a fluorescence of the DAPI dye, which binds to DNA and can thus render cell nuclei particularly readily distinguishable. The microscope images 20 and the corresponding contrast images 60 are used as training data T' for a model M'. The microscope images 20 act as input data. An output image of the model M' should be a calculated contrast image 70, which should ideally correspond to the associated contrast image 60. Model parameters of the model M' are iteratively adjusted to this end. Upon completion of the training, the model M' is able to generate a calculated contrast image 70A from an input microscope image 20A for which a captured contrast image is not available. This can help to preserve the sample, as the generation of such a virtually stained image does not have the same impact on the sample as a fluorescence analysis or other staining techniques necessarily involve. It is also possible to eliminate any expenditure for equipment required for capturing a contrast image, e.g. a fluorescence image, or to omit a sample preparation that may be associated with the contrast procedure. A calculated contrast image 70A can be used, inter alia, in sample navigation: based on the calculated contrast image 70A, a user or a subsequent automatic image analysis can select a sample area for further analysis. Compared to the microscope image 20A, the calculated contrast image 70A has the advantage that sample structures 21 are accentuated while other structures are largely hidden. It is problematic, however, that virtual staining can add hallucinated sample details 22, e.g. organelles or other cell components, within the sample structure 21. In such cases, sample components not actually present in the sample are added to the calculated contrast image 70A by the model M'. A shape of the sample structure 21 that is indicated with precision in the calculated contrast image 70A also does not always correspond to the actual shape. This can hamper subsequent processes such as, for example, a navigation. In principle, the cited problems can be attenuated if the scope of training data T' is increased. If novel microscope images that deviate more significantly from a statistical distribution of the training data T' are processed, however, even an increased scope of training data T' cannot prevent errors to a satisfactory degree.

Methods for virtually staining samples are described, e.g., in EP 3 553 165 A1, U.S. Pat. No. 9,786,050 B2 and U.S. Pat. No. 10,013,760 B2, as well as in:

Christiansen, Eric, et al., "In Silico Labeling: Predicting Fluorescent Labels in Unlabeled Images," 2018, Cell 173, 792-803, Apr. 19, 2018, Elsevier, doi: https://doi.org/10.1016/j.cell.2018.03.040

Ounkomol, Chawin, et al., "Label-free prediction of three-dimensional fluorescence images from transmitted light microscopy", bioRxiv preprint, 23.05.2018, https://doi.org/10.1101/289504

Alvarenga, Lauren, Olympus Discovery Blog, 2 Sep. 2020, "A Video Introduction to Label-Free Nucleus Detection with TruAI Technology", https://www.olympus-lifescience.com/en/discovery/a-video-introduction-to-label-free-nucleus-detection-with-truai-technology/

In WO 2019/160580 A1, the capture of unstained images and locationally co-registered stained images is described. Masks are derived from the stained images, whereupon a mapping from an unstained image to a mask is learned.

As background information regarding a possible architecture of an image processing model, reference is made to: Ronneberger, Olaf, et al., "U-Net: Convolutional Networks for Biomedical Image Segmentation", arXiv:1505.04597v1, 18.05.2015.

As further background information, reference is made to a method for transferring an image style to another image, as described in: Gatys, Leon A., et al., "Image Style Transfer Using Convolutional Neural Networks", Proceedings of the IEEE Conference on Computer Vision and Pattern Recognition (CVPR), 2016, pages 2414-2423.

A conditional generative adversarial network (conditional GAN) is disclosed in: Isola, Phillip, et al., "Image-to-Image Translation with Conditional Adversarial Networks", arXiv: 1611.07004v3 [cs.CV] 26 Nov. 2018.

A special type of conditional generative adversarial network with which a cycle consistency is achieved is described in: Zhu, Jun-Yan, et al. "Unpaired Image-to-Image Translation using Cycle-Consistent Adversarial Networks", arXiv:1703.10593v7, 24/08/2020.

SUMMARY OF THE DISCLOSURE

It can be considered an object of the invention to indicate a microscopy system and a method which enable a straightforward generation of a contrast image that renders sample structures readily distinguishable without an incorrect addition of detail structures.

This object is achieved by means of the method and the microscopy system with the features of the attached claims.

In a computer-implemented method for generating an image processing model that generates output data defining a stylized contrast image from a microscope image, model parameters of the image processing model are adjusted by optimizing at least one objective function using training data. The training data comprises microscope images as input data and contrast images. The microscope images and the contrast images are generated by means of different microscopy techniques. In order for the output data to define a stylized contrast image, the objective function forces a detail reduction or the contrast images are detail-reduced contrast images with a level of detail that is lower than in the microscope images and higher than in binary images.

It is thereby possible to generate a stylized contrast image in which sample structures are rendered readily distinguishable according to the contrast method. The stylized contrast image is thereby suitable for subsequent tasks such as a sample navigation or a counting of depicted biological cells. At the same time, the problems described in relation to the prior art, in particular the addition of hallucinated sample details or the deviation of a sample shape indicated with precision from an actual sample shape, are avoided by means of the stylization. It is thus possible to avoid the widespread problem in the prior art of the depiction of very realistic-looking sample details which, however, have been invented by the model and are not actually present. Implementations of the invention can employ a specific objective function and/or specific target images in the training of the image processing model, as will be described in greater detail later on. Via these designs, the image processing model can be less complex and thereby more robust vis-à-vis conventional virtual staining models. This can yield a better generalizability so that consequently even a microscope image that deviates more significantly from a statistical distribution of the microscope images seen in the training can be processed without error. In certain circumstances, it is possible to choose a scope of training data that is smaller than with conventional virtual staining models.

In a computer-implemented method according to the invention for generating a stylized contrast image, a microscope image is first received. A stylized contrast image is calculated from the microscope image by means of an image processing model generated according to the invention.

A microscopy system of the invention comprises a microscope for image capture and a computing device configured to execute the computer-implemented method according to the invention.

A computer program of the invention comprises commands that, when the program is executed by a computer, cause the execution of the method according to the invention.

Optional Embodiments

Variants of the microscopy system according to the invention and method according to the invention are the object of the dependent claims and are explained in the following description.

Microscope Images and Contrast Images

Microscope images and captured contrast images are generally understood in the present disclosure as images captured by microscopes using different microscopy techniques or contrast methods. The microscope images and captured contrast images can stem from the same microscope or different microscopes. Different microscopy methods or contrast methods can be understood as, e.g., transmitted light methods, light sheet microscopy, phase-contrast methods, DIC (differential interference contrast) methods, dark-field imaging, fluorescence methods or imaging following a chemical staining of a sample. While the same method can generally be used, depending on the sample, to capture either a microscope image or a contrast image, fluorescence methods and chemical staining can be employed in particular for capturing a contrast image.

Detail Reduction of Contrast Images or Detail Reduction by Means of the Objective Function The training of the image processing model can be designed so that a stylized or detail-reduced generation of output images is learned. For the purposes of detail reduction, it is in particular possible for a corresponding modification of captured contrast images to occur, or for a similar computation to occur in the objective function to be optimized.

For example, the detail reduction can relate to an image definition (image sharpness) and/or a color depth. The color depth can be understood as a maximum number of different brightness values allowed, a contrast image potentially comprising one or more color channels.

If the detail-reduced contrast images are generated by means of a detail reduction of captured contrast images, then, e.g., an image definition reduction or blurring of adjacent pixels of the captured contrast images can be carried out. This can occur, e.g., by convolution with a Gaussian filter. A smoothing of shape contours in the captured contrast images can also occur, e.g., by determining and simplifying edge contours or object shapes, in particular by making them more linear and less jagged or frayed. A corresponding manipulation or image transformation is applied to the captured contrast image in order to obtain a detail reduction. Additionally or alternatively, the detail reduction can take the form of a reduction of a color depth of the captured contrast images in order to constitute the detail-reduced contrast images. A number of different possible brightness values can be limited, for example, to a value between 3 and 100, in particular between 5 and 50. This limitation can occur, e.g., by grouping together brightness values or grey values of a total value range in a standardized manner. Alternatively, grey values can also be amalgamated into a common value as a function of the image, e.g., all brightness values or grey values below an image noise level can be merged into a common value of, e.g., 0.

These operations can also occur, alternatively or additionally, in the objective function. In these cases, the objective function forces the detail reduction. The objective function can thus describe a lack of image definition or a blurring of adjacent pixels of a contrast image or carry out a quantization of values of pixels of the target images (contrast images). Quantization reduces the number of available brightness gradations or possible brightness values and thus constitutes a color depth reduction.

In cases of a quantization of the target image values in the objective function, the image processing model can optionally be designed such that only the value range of the quantization is utilized in a model prediction. If, for example, the original target images were 12 bit images, i.e. with 4096 different brightness values, and a quantization to 4 bit (i.e. 16 different brightness values) is to occur, the image processing model can be designed so that merely 16 different brightness values are possible in the output image.

If a quantization of brightness values is carried out for the purposes of detail reduction, then quantization levels can be predetermined or defined automatically by means of an assessment of one or more of the contrast images. Quantization levels denote ranges of brightness values that are combined into a common brightness value for the purposes of detail reduction. In an assessment of contrast images for the purpose of establishing the quantization levels, it is possible for, e.g., an object localization to occur first, e.g., by means of a model learned for this purpose. A brightness distribution can be determined for pixels of a background, i.e. for pixels outside the localized objects. This brightness distribution can be compared with a brightness distribution of pixels of the localized objects in the contrast images. It is thereby possible to determine a brightness threshold value of a quantization level so that mainly pixels of the background are captured, which are then merged into a common brightness value.

A lack of image definition or blurring can be described by the objective function when said objective function does not merely capture respective differences between two positionally corresponding pixels $P_{ij}$ and $P'_{ij}$ of a calculated contrast image and an associated predetermined contrast image. Instead, the objective function can also capture differences between a pixel $P'_{ij}$ of the calculated contrast image and a plurality of pixels of the associated contrast image which are adjacent to the pixel $P_{ij}$, e.g., as follows:

$$w_{i-1,j-1} \cdot (P_{ij} - P'_{i-1,j-1})^2 + w_{i,j-1} \cdot (P_{ij} - P'_{i,j-1})^2 + \ldots + w_{i+1,j+1} \cdot (P_{ij} - P'_{i+1,j+1})^2$$

The weights w in the above sum define a strength or type of a blurring and can be predetermined, e.g., according to a Gaussian filter.

The specification that the level of detail of the detail-reduced contrast images is lower than in the microscope images and higher than in binary images can be implemented in particular by means of the following features: The level of detail can relate to an image definition and/or a number of gradations of brightness and can be lower in the detail-reduced contrast images than in the microscope images. Binary masks can be, for example, segmentation masks and indicate a pixelwise classification into 'background' and 'object' by means of merely two different pixel values. The employed detail-reduced contrast images are not equivalent to such binary masks, but rather have a higher level of detail; in particular, a pixelwise brightness is indicated instead of a pixelwise classification. Segmentation masks are thus not used as target images in the training in variants of the invention. Since detail-reduced contrast images indicate different brightnesses, it is still possible for intensities to be indicated in calculated stylized contrast images, said intensities providing, e.g., information regarding a cell stage of samples under observation. However, depending on the case, it is also possible for output data of the ready-trained image processing model to correspond to a segmentation mask in terms of information content, e.g., when a low variable level of stylization is chosen on account of a low predictive certainty, as will be described in greater detail later on. In such cases, a difference vis-à-vis a standard segmentation mask can be that object edges are optionally blurred as a function of predictive certainty, i.e. they do not form any sharp edges as in binary masks, and/or an edge contour of a segmented area is smoothed, i.e. the edge contour is rendered more linear and is less frayed.

For a detail reduction of a captured contrast image, it is also possible to employ an autoencoder which has been trained, e.g., using captured contrast images. An autoencoder comprises an encoder, which calculates a compressed representation of an input image, and a decoder, which calculates an image from the compressed representation that extensively reconstructs the input image. A limitation of a bottleneck layer predetermines a size or information scale of the compressed representation. A greater limitation forces a more compressed representation, whereby more details are lost in the image reconstructed by the decoder. A level of detail reduction can thus be predetermined by means of the limitation of the bottleneck layer. Detail-reduced contrast images can accordingly be generated by the autoencoder from captured contrast images. This type of detail reduction can also be combined with the other cited techniques for detail reduction.

Detail Reduction by Image Style Transfer

By means of a style or texture transfer algorithm, it is possible to generate the detail-reduced contrast images using captured contrast images and at least one image-style example image. The image-style example image has a lower level of detail than the captured contrast images. For example, it can show oval-shaped objects that appear to be three-dimensional against a monochrome background. The style transfer algorithm calculates one of the detail-reduced contrast images from one of the captured contrast images and the at least one image-style example image. This can occur according to the method "Image Style Transfer Using Convolutional Neural Networks" cited in the introduction. For example, a ready-trained, in particular for object detection, convolutional neural network (CNN) is used. Only a first encoding part of the CNN is employed for the style transfer, said encoding part calculating, from an input image, a feature vector constituting a compressed representation of the input image. A captured contrast image is input into the CNN in order to calculate an associated feature vector constituting a representation of the content of the captured contrast image. In order to use an image style of the image-style example image, the image-style example image is also entered into the CNN. A correlation is calculated for filter responses in a layer of the CNN. Such feature correlations can be calculated for a plurality of layers of the CNN. These feature correlations constitute a representation of a local texture or style that is not strongly influenced by locations within the image, i.e. by a concrete image content. In order to now generate a detail-reduced contrast image, a random vector, for example a noise image, can be input into the CNN and the layers of the CNN calculate a relative output. An image-content loss function can be defined as the sum of the pixelwise differences between this output and the output of the layer in question calculated from the captured contrast image. By means of a gradient descent method, it is possible to calculate from the image-content loss function how to iteratively modify the output so as to obtain a match with the output of the layer in question calculated from the captured contrast image. By means of a reverse calculation in the CNN, it is possible to determine from the iteratively modified output how the noise image changes. In this iterative adjustment, it is thus not model parameters of the ready-trained CNN that are modified, but the input noise image. The input noise image iteratively increasingly approximates the captured contrast image. Concurrently with this optimization of the image-content loss function, an image-style loss function is optimized. This captures a difference between the aforementioned correlations calculated from the image-style example image and correlations calculated accordingly for the input noise image. Since both loss functions are optimized together, the original noise image is iteratively modified such that its represented content increasingly approximates the captured contrast image while its image style increasingly approximates the image-style example image. This procedure can be performed for every captured contrast image in order to create corresponding detail-reduced contrast images.

It is possible to use image-style example images in different image styles in order to generate a plurality of training data sets. This allows an image processing model to be learned which can generate stylized contrast images in a selectable image style. A selectable image style can be entered in the training and by inference together with a microscope image to be processed. Alternatively, a plurality of image processing models can be learned with the plurality of training datasets, wherein the image processing models generate stylized contrast images in different styles. Upon completion of the training, by inference, it is possible to use an image processing model according to the associated choice of an image style made by a user.

Capturing Detail-Reduced Contrast Images

Detail-reduced contrast images do not necessarily have to be calculated from captured contrast images (which have a higher level of detail). Instead, the level of detail of detail-reduced contrast images can also be reduced directly by corresponding image capture properties. For example, blurring/a lack of definition can also be achieved by means of capture parameters of the microscope, e.g., by means of a defocusing. In these cases, contrast images can be blurred or captured with a lower color depth compared to microscope images. For a reduced level of detail, it is also possible for a contrast image to be captured with a lower image resolution than a microscope image and subsequently scaled to the image size of the microscope image.

Variable Level of Stylization Depending on the Certainty of the Model Prediction An output of the image processing model can optionally indicate in an intermediate layer or in final output data a certainty or confidence level of a model prediction of the image processing model. The certainty indicates the probability with which the image processing model estimates that the determined model prediction, i.e. a stylized contrast image defined by the output data, is correct. Alternatively, the image processing model can predict a distribution of possible output data, and a certainty or confidence level is derived from this distribution. For example, a brightness distribution can be output instead of a single brightness for a pixel and the certainty of the model prediction results from the brightness distribution, e.g., from its width. The image processing model or a subsequent program is designed to carry out a more extensive detail reduction in the output data defining a stylized contrast image, the lower the certainty of the model prediction. For example, a higher quantization, i.e. a reduction of allowed pixel values to a smaller number of allowed pixel values, can be performed. An edge contour can also be smoothed for detail reduction so that an object shape in the detail-reduced contrast image approximates a regular shape and indicates fewer uncertain details. An edge between an object and a background in the detail-reduced contrast image can also be replaced by a less defined or softer transition for the purposes of detail reduction.

A lower certainty can occur, e.g., when a microscope image which differs more significantly from the microscope images used in the training or which only displays sample structures with inadequate precision is input into the image processing model after completion of the training.

A reduced level of detail that depends on the certainty of a model prediction can be applied uniformly to an entirety of a stylized contrast image. In this case, the calculated certainty can relate to the entirety of the predicted stylized contrast image and, if necessary, be determined by averaging a plurality of certainties calculated pixelwise.

Alternatively, different levels of detail reduction can also occur within the same stylized contrast image. The certainty of the model prediction can be indicated pixelwise or by image area to this end. The image processing model or a subsequent program can be designed to carry out a detail reduction in the output data defining a stylized contrast image pixelwise or by image area depending on the certainty of the model prediction indicated for corresponding pixels or image areas.

In supplemental embodiments, the image processing model can be designed to calculate a plurality of stylized contrast images from an input microscope image, wherein the stylized contrast images have been detail-reduced in various of the described manners. A confidence level of the model prediction is calculated for each stylized contrast image. For the input microscope image, the stylized contrast image with the highest certainty of prediction is selected and used while the other stylized contrast images of lower confidence levels are discarded. The image processing model can have a multi-head architecture, wherein the input microscope image is first processed on a common pathway, whereupon the pathway splits into different paths leading to the different stylized contrast images.

Selectable Level of Detail Reduction

The image processing model can be trained to implement a selectable level of detail reduction. Different sets of detail-reduced contrast images, which are detail-reduced to varying degrees, can be used in the training to this end. Alternatively, it is possible to optimize a plurality of objective functions, in particular in separate training runs, wherein the objective functions predetermine different levels of detail reduction. For example, the size of an image window over which an averaging occurs for a blurring can be varied. It is also possible for a central pixel to be weighted so as to be weaker in the image window over which an averaging occurs for a blurring, which results in a stronger blurring or a greater lack of definition. An indication of the level of detail reduction can be input together with an associated microscope image in the training. Upon completion of the training, a microscope image can be entered into the image processing model together with a selectable or desired level of detail reduction, whereupon the image processing model outputs a stylized contrast image according to the selected level of detail reduction.

The different levels of detail reduction can be implemented by a single image processing model, or alternatively by a plurality of image processing models, wherein, following the training according to a selectable level of detail reduction, the associated image processing model is employed to process a microscope image.

Detail-Reduced 3D Prediction

Compared to conventional methods for the virtual staining of a microscope image, one of the benefits achieved by the detail reduction is that it reduces a risk of invented, inaccurate sample details being added in the calculated image. In light of this increased predictive certainty, the image processing model can also be supplemented with a functionality to calculate a three-dimensional detail-reduced contrast image or an image stack of vertically staggered detail-reduced contrast images from an input 2D microscope image.

For this purpose, the training data can comprise respective sets of a plurality of vertically staggered contrast images of a same sample. The training data can contain a single microscope image registered in a lateral direction relative to the vertically staggered contrast images for a plurality of vertically staggered contrast images. The vertically staggered contrast images can also be combined into a 3D model. The image processing model is trained to calculate output data defining a plurality of vertically staggered stylized contrast images or a stylized 3D model from a single input microscope image.

In further variants, a plurality of vertically staggered microscope images or three-dimensional microscope images are entered. The training data comprises corresponding vertically staggered contrast images. The image processing model can thereby learn a 3D-to-3D mapping. A 3D-to-2D mapping of a plurality of vertically staggered microscope images onto a single stylized contrast image is also possible.

CycleGAN

In different variant embodiments, microscope images and contrast images are used in the training which are registered, i.e. a sample point has the same image coordinates in both images. This can occur, e.g., in practical manner when the microscope images and contrast images are captured with the same microscope. In other embodiments, however, it is also possible for the training data to comprise microscope images and contrast images that are not registered. It is in particular also not necessary for these microscope images and contrast images to show the same samples; they can instead be captured using different samples, preferably of the same sample type.

Unregistered microscope images and contrast images can be used, e.g., when a network called a CycleGAN is used in the training. The latter comprises two pairs of generative adversarial networks (GAN). The generators of the two GANs are to learn in particular a mapping from microscope images to detail-reduced contrast images and back. The image processing model is constituted by a contrast image generator of a (first) generative adversarial network, which also comprises a contrast image discriminator. The contrast image discriminator is trained to discriminate whether an input image is a predetermined (in particular detail-reduced) contrast image or a stylized contrast image generated by the image processing model. The contrast image generator, on the other hand, is trained to generate stylized contrast images that the contrast image discriminator can ideally not distinguish from predetermined contrast images. The first generative adversarial network is simultaneously trained with a second generative adversarial network comprising a microscope image generator and a microscope image discriminator. The microscope image generator is trained to generate a reconstructed microscope image from a stylized contrast image (calculated by the image processing model). The microscope image discriminator is trained to discriminate whether an input image is a microscope image or a reconstructed microscope image.

The reconstructed microscope image should not look like just any microscope image, but should resemble the very microscope image by means of which the reconstructed microscope image was generated via the corresponding stylized contrast image. This can also apply analogously to the contrast image and an associated calculated/stylized contrast image generated via the corresponding reconstructed microscope image. A first consistency function which captures differences between a microscope image and an associated reconstructed microscope image is thus optimized simultaneously with the training of the two GANs cited above, wherein the reconstructed microscope image is generated by inputting said microscope image into the contrast image generator and inputting the thus created stylized contrast image into the microscope image generator. A second consistency function which captures differences between a contrast image and an associated reconstructed/ stylized contrast image can also be simultaneously optimized, wherein the reconstructed contrast image is generated by inputting the contrast image into the microscope image generator and inputting the thus created microscope image into the contrast image generator.

Upon completion of the training, the contrast image generator is used as an image processing model while the remaining components of the two GANs are not necessary for processing a microscope image.

In general, in light of their generative capabilities in terms of creating image content, there is a risk associated with GANs of an addition of non-existent, invented sample structure details. Thanks to the detail reduction, however, this risk is reduced.

In the variant embodiment described above, the predetermined training data can comprise microscope images and detail-reduced contrast images. Alternatively, it is also possible to use captured contrast images as training data when the objective function of each GAN, in particular a respective adversarial loss, is adjusted accordingly, as described in the foregoing in relation to the detail reduction.

Render Program for Rendering a Stylized Contrast Image

The output data defining a stylized contrast image can be the stylized contrast image itself. Alternatively, the output data can constitute instructions for forming the stylized contrast image. For example, the output data can comprise geometric information or other instructions for a subsequent render program. A render program denotes software that calculates a 2D image or a view of a 3D model from input geometric information. It is optionally possible for further indications to be implemented in addition to geometric information; for example, a type of an object defined by the geometric information can be indicated. The type can designate, e.g., different cell types or cell organelles for which associated renderings or textures are stored in the render program. It is also possible for at least one brightness or intensity to be indicated for an object defined by the geometric information, which is implemented accordingly by the render program. The render program does not have to generate a realistic-looking reconstruction of contrast images; instead, the detail reduction can also be implemented by means of a comic-like rendering.

Alternatively, the image processing model can itself be designed to output a stylized contrast image that resembles a rendered image. In particular, sample objects can be displayed in a three-dimensional representation by means of basic geometric shapes. A render program can optionally be used in this embodiment to generate the detail-reduced contrast images used in the training.

In a variant, the stylized contrast images generated by the render program are used as target images for a new training so that an image processing model learns directly a mapping of a microscope image to an output image which corresponds to an image generated by the render program.

General Features

A microscopy system denotes an apparatus that comprises at least one computing device and a microscope. A microscope can in particular be understood as a light microscope, an X-ray microscope, an electron microscope or a macroscope.

The computing device can be designed to be decentralized, be physically part of the microscope or arranged separately in the vicinity of the microscope or at a location at any distance from the microscope. It can generally be formed by any combination of electronics and software and comprise in particular a computer, a server, a cloud-based computing system or one or more microprocessors or graphics processors. The computing device can also be configured to control the sample camera, the overview camera, image capture, the sample stage and/or other microscope components.

The sample can be any sample and can include, for example, biological cells or cell parts, material samples or rock samples, electronic components and/or objects held in a liquid.

The microscope is configured for an image capture, in particular of microscope images and/or contrast images. In some cases, the microscope is configured to capture a microscope image only, e.g. a phase-contrast image, but is not configured to capture a contrast image, e.g. a fluorescence image. It is possible in this case to generate with the microscope, by running the trained image processing model, a stylized contrast image corresponding to a detail-reduced captured contrast image, without it being necessary for means for capturing a contrast image to be present.

A microscope image can be essentially any raw image captured by a microscope or a processed image. The processed image can stem from one or more raw images or pre-processed images of a microscope. For example, a microscope image can be a perspective-transformed image and/or formed by joining a plurality of raw images together when the raw images show laterally overlapping sample areas (image stitching). The microscope image can also be calculated by an adjustment of brightness, contrast or tone values. The microscope image can in particular be an overview image or a sample image or be derived therefrom. An overview image is understood to be an image captured by an overview camera, which can be provided in addition to a sample camera of the microscope with which images (sample images) of a sample area are captured with a higher magnification. The overview camera can be mounted on a stationary frame of the apparatus, e.g. a microscope stand, or on a movable component, e.g. a sample stage, focus drive or objective revolver. Receiving an image can comprise in particular the loading of an available image from a memory or the capture of an image with a camera. The above descriptions can also apply mutatis mutandis to contrast images. A stylization of the stylized contrast images can be understood in the sense of a structurally reduced representation in which structural or textural details are removed, object shapes are optionally simplified and even a mode of representation in the form of a line drawing, a vector graphic, a comic or a rendered image is possible.

In particular a sample navigation, an image segmentation or a localization and counting of cell nuclei or other sample structures can occur based on a stylized contrast image. Corresponding algorithms or programs which are in particular not specially adapted for stylized contrast images can be used for these purposes. It is thus possible to employ conventional programs for these purposes, which, for example, perform a simple threshold value comparison in order to perform an image segmentation. In stylized contrast images, a behavior of a sample can also be determined in a chronological sequence. For example, movements, trajectories, interactions or stages of cells, such as cell divisions, can be analyzed.

Descriptions in the singular are intended to cover the variants "exactly 1" as well as "at least one". The description that a microscope image is input into the image processing model is intended to comprise, for example, the possibilities of an input of exactly one microscope image and of an input of at least one microscope image. A collective input of a plurality of microscope images can be advantageous, e.g., in the event of an input of an image stack (Z-stack) consisting of a plurality of microscope images showing sample layers lying at a distance from one another, or in the event of an input of a plurality of successively captured microscope images showing the same sample area.

A target image can be understood as an image used in the training of the image processing model which an output of the image processing model is intended to approximate. Approximation occurs by means of an objective function, in particular a reward function and/or loss function, which specifies how differences between the output of the image processing model and the target image are evaluated. The evaluation of the differences can occur pixelwise or by comparing more abstract image descriptions, e.g. edge contours. A target image is formed via a captured contrast image, i.e. the target image can be precisely a captured contrast image, or the target image can be generated by further processing of a captured contrast image, depending on the selected objective function.

An image processing model is understood to be a machine-learned model that receives at least image data as input data and calculates at least one output image therefrom or output data defining an image. The output data can also comprise, e.g., volumetric data or a three-dimensional model. Learned models denote models that have been learned by a learning algorithm using training data. The models can respectively comprise, for example, one or more convolutional neural networks (CNNs), which receive at least one image comprising the microscope image or image data derived therefrom as input. In a supervised learning process, a respective annotation/label is specified for each microscope image. Unsupervised learning processes are possible, e.g., when the described CycleGAN architecture is used. Model parameters of the model are defined by means of a learning algorithm using the training data. A predetermined objective function can be optimized to this end, e.g. a loss function can be minimized. The model parameter values are modified to minimize the loss function, which can be calculated, e.g., by gradient descent and backpropagation. In the case of a CNN, the model parameters can in particular comprise entries of convolution matrices of the different layers of the CNN. Layers that are not directly sequential can optionally be connected by so-called "skip connections", whereby the output of a layer is relayed not only to the directly following layer, but also to another layer. Other deep neural network model architectures are also possible.

Input data into the image processing model can also comprise, in addition to at least one microscope image, further data, in particular contextual information regarding the at least one microscope image, e.g. information on a capture type of the microscope image, a microscope parameter used in said capture or a sample type, e.g., which cell lines are depicted. The contextual information is entered in the training as an adjunct. By inference, the input of contextual information is optional.

The characteristics of the invention that have been described as additional apparatus features also yield, when implemented as intended, variants of the method according to the invention. Conversely, a microscopy system can also be configured to carry out the described method variants. In particular, the computing device can be configured to carry out the described method variants. The computing device can also comprise the described computer program. While a ready-trained model is used in some variants, other variants of the invention result from the implementation of the corresponding training steps, and vice versa.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Different example embodiments are described in the following with reference to the figures.

Figure 2:
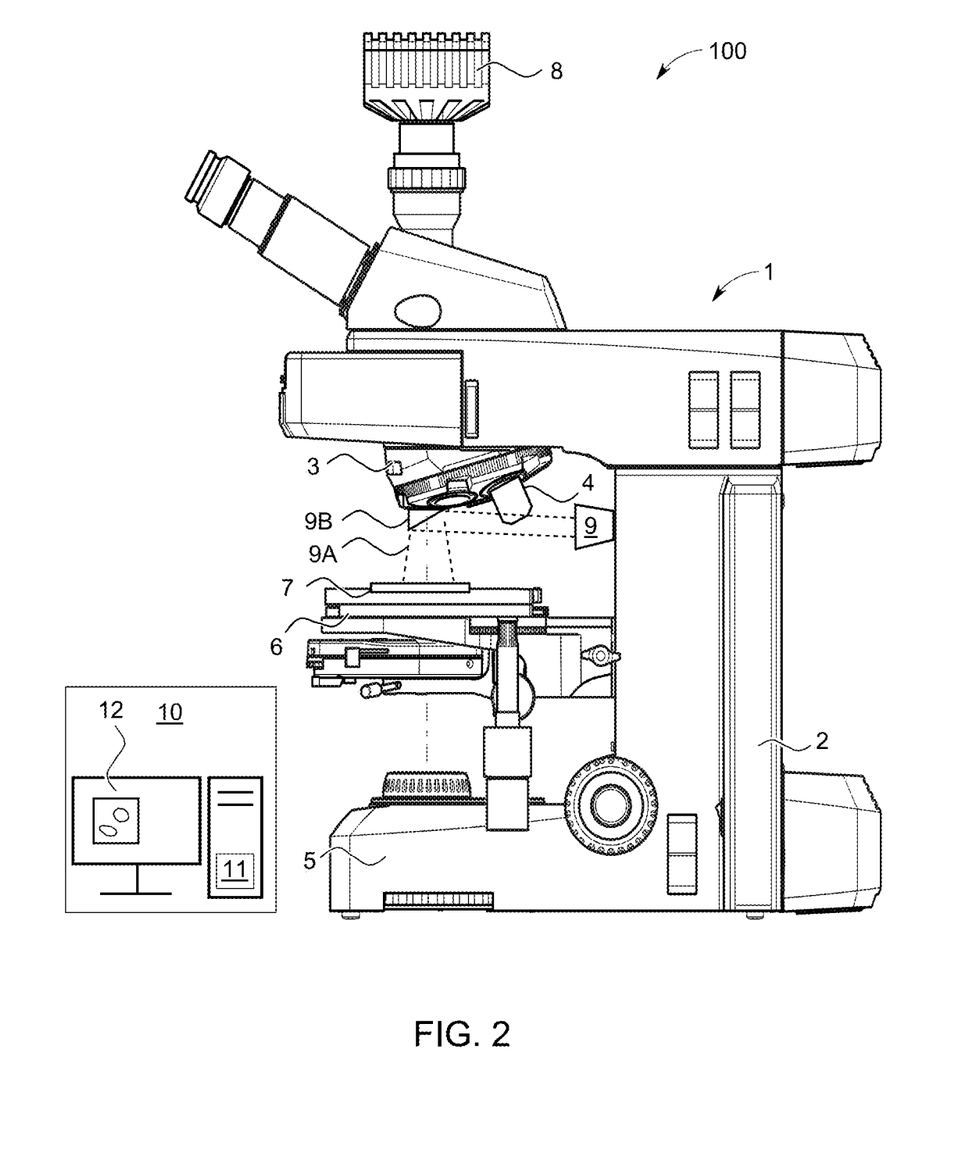
FIG. 2 shows schematically an example embodiment of a microscopy system of the invention.

FIG. 2

FIG. 2 shows an example embodiment of a microscopy system 100 according to the invention. The microscopy system 100 comprises a computing device 10 and a microscope 1, which is a light microscope in the illustrated example, but which in principle can be any type of microscope. The microscope 1 comprises a stand 2 via which further microscope components are supported. The latter can in particular include: an illumination device 5; an objective changer/revolver 3, on which an objective 4 is mounted in the illustrated example; a sample stage 6 with a holding frame for holding a sample carrier 7; and a microscope camera 8. When the objective 4 is pivoted into the light path of the microscope, the microscope camera 8 receives detection light from a sample area in which a sample can be located in order to capture a microscope image. A sample can be any object, fluid or structure. The microscope 1 optionally comprises an additional overview camera 9 for capturing an overview image of a sample environment. The overview image can thus show in particular the sample carrier 7 or a part of the same. A field of view 9A of the overview camera 9 is larger than a field of view when a sample image is captured. In the illustrated example, the overview camera 9 views the sample carrier 7 via a mirror 9B. The mirror 9B is arranged on the objective revolver 3 and can be selected instead of the objective 4. The mirror is omitted or a different arrangement of the mirror or of some other deflecting element is provided in variants of this embodiment. The computing device 10 comprises an optional touchscreen 12 and a computer program 11 with an image processing model for processing at least one microscope image, i.e. a sample image or overview image. This is discussed in greater detail in the following with reference to FIG. 3.

Figure 3:
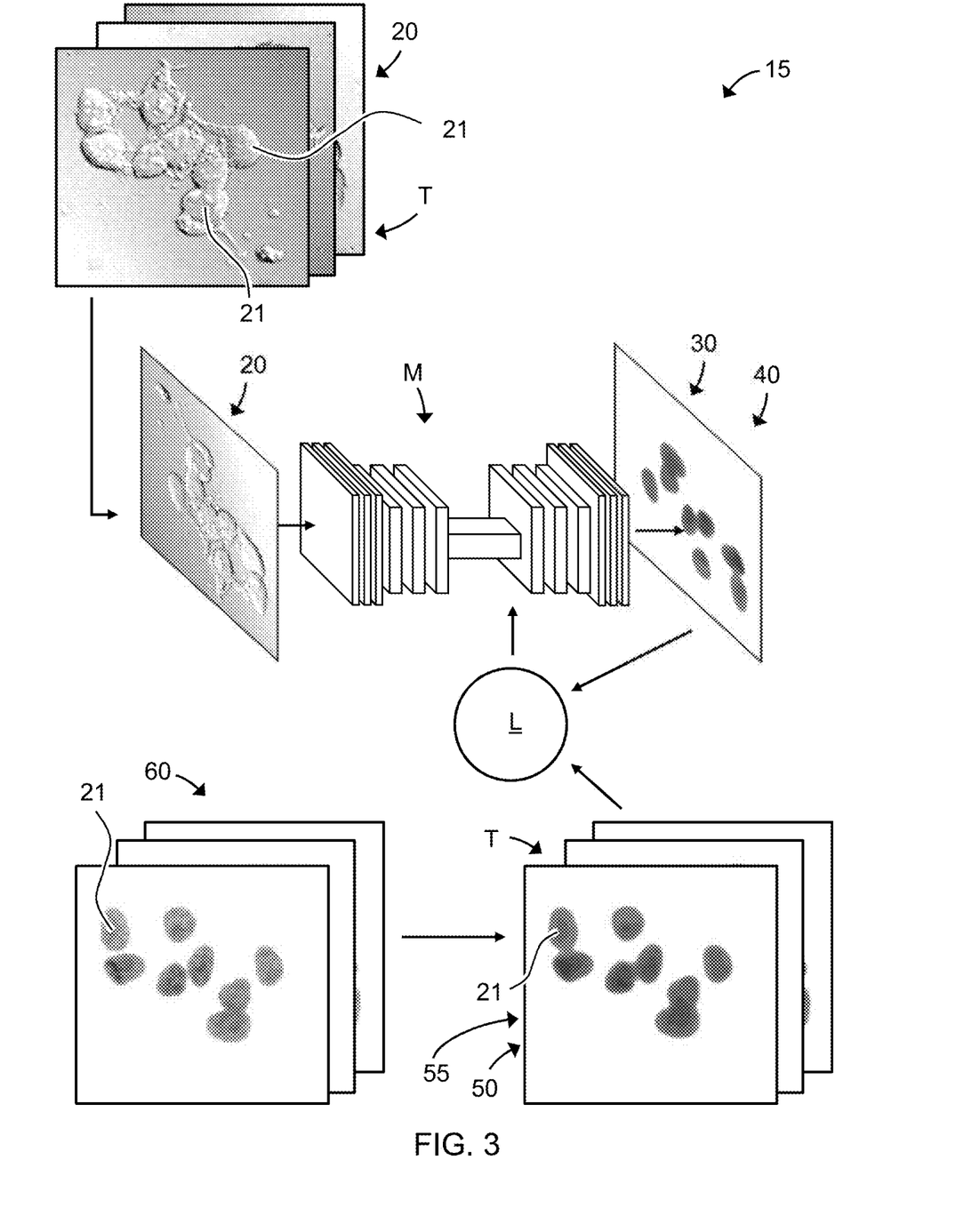
FIG. 3 shows schematically processes of an example embodiment of a method of the invention.

FIG. 3

FIG. 3 illustrates a training 15 of an image processing model M intended to calculate output data 40 defining a stylized contrast image 30 from a microscope image 20.

Training data T comprises a plurality of microscope images 20 respectively showing sample structures 21. In the illustrated example, the microscope images 20 are phase-contrast images in which sample structures 21 are often difficult to distinguish from other structures or from a background.

Captured contrast images 60 are also provided. In this example, the captured contrast images are fluorescence images. In general, the captured contrast images 60 are images captured with a different capture technique or a different sample preparation than the microscope images 20.

In the variant embodiment shown in FIG. 3, the captured contrast images 60 are not used directly as training data T. Instead, detail-reduced contrast images 50 are first calculated from the captured contrast images 60. As illustrated, the number of possible image brightness values can be reduced, e.g., to a number between 3 and 50. The reduction can be equidistant, wherein an equal number of different brightness values are merged into a common value, or non-equidistant. For example, all background grey values can be merged into a common brightness value or grey value, e.g. a brightness value for black. All grey values above object values can also be merged into a single brightness value, which can be equal to the aforementioned common brightness value or can be another brightness value, e.g. a brightness value for white. For a range of grey values that occur in objects, a binning into a plurality of possible brightness values can optionally be provided. The binning can be determined automatically or be specified by the user. In addition, a perimeter shape of sample structures 21 can be smoothed, i.e. a frayed perimeter shape can be modified towards an oval or smooth shape. This can occur, e.g., by means of a connected-components analysis in the captured contrast images 60. It is also possible for a blurring of brightness values or a lack of definition to be calculated, for example by averaging the brightness values of adjacent pixels.

The detail-reduced contrast images 50 generated in this manner are used as target images in the training of the image processing model M. The image processing model M can comprise a deep neural network, e.g. a CNN. Values of model parameters of the image processing model M, e.g. values of convolution matrices of the CNN, are adjusted iteratively in the training. Based on initial values of the model parameters, the image processing model M respectively calculates an output image, which is ideally a stylized contrast image 30, from input microscope images 20. An objective function or loss function L to be optimized captures a difference between the output image (the stylized contrast image 30) and an associated target image (the detail-reduced contrast image 50). The difference can be captured, e.g., by calculating differences between brightness values of locationally corresponding pixels of the stylized contrast image 30 and the detail-reduced contrast image 50. An amount or square of the differences is added together. By means of a gradient descent method, it can be determined how values of the model parameters are to be modified in order to minimize the loss function L. By inference, i.e. upon completion of the training, the image processing model M is able to calculate, from a microscope image 20 not seen in the training, a stylized contrast image 30 which corresponds to a detail-reduced contrast image.

By means of the detail reduction in the employed target images, the training can be carried out with less training data and tends to achieve a better robustness and generalizability. It also reduces the risk of adding invented details to the sample structures 21, e.g., incorrectly adding cell organelles within a sample structure 21 or indicating a specially shaped perimeter of the sample structure 21 that does not conform to the actual perimeter shape. The stylized contrast images 30 are suitable for various subsequent activities, e.g. for a sample navigation in which a user or a computer program selects, based on the stylized contrast image 30, regions which are positioned by means of, for example, a movable sample table and subjected to a more in-depth analysis with a higher magnification. The stylized contrast images 30 are also suitable for algorithms for automatically counting imaged cells. Advantageously, existing programs designed for, e.g., captured contrast images 60 or virtually stained fluorescence images can be employed for this kind of automatic image analysis without it necessarily being required to adapt such programs to the stylized contrast images 30 provided.

An alternative variant for detail reduction is described below with reference to the following figure.

Figure 4:
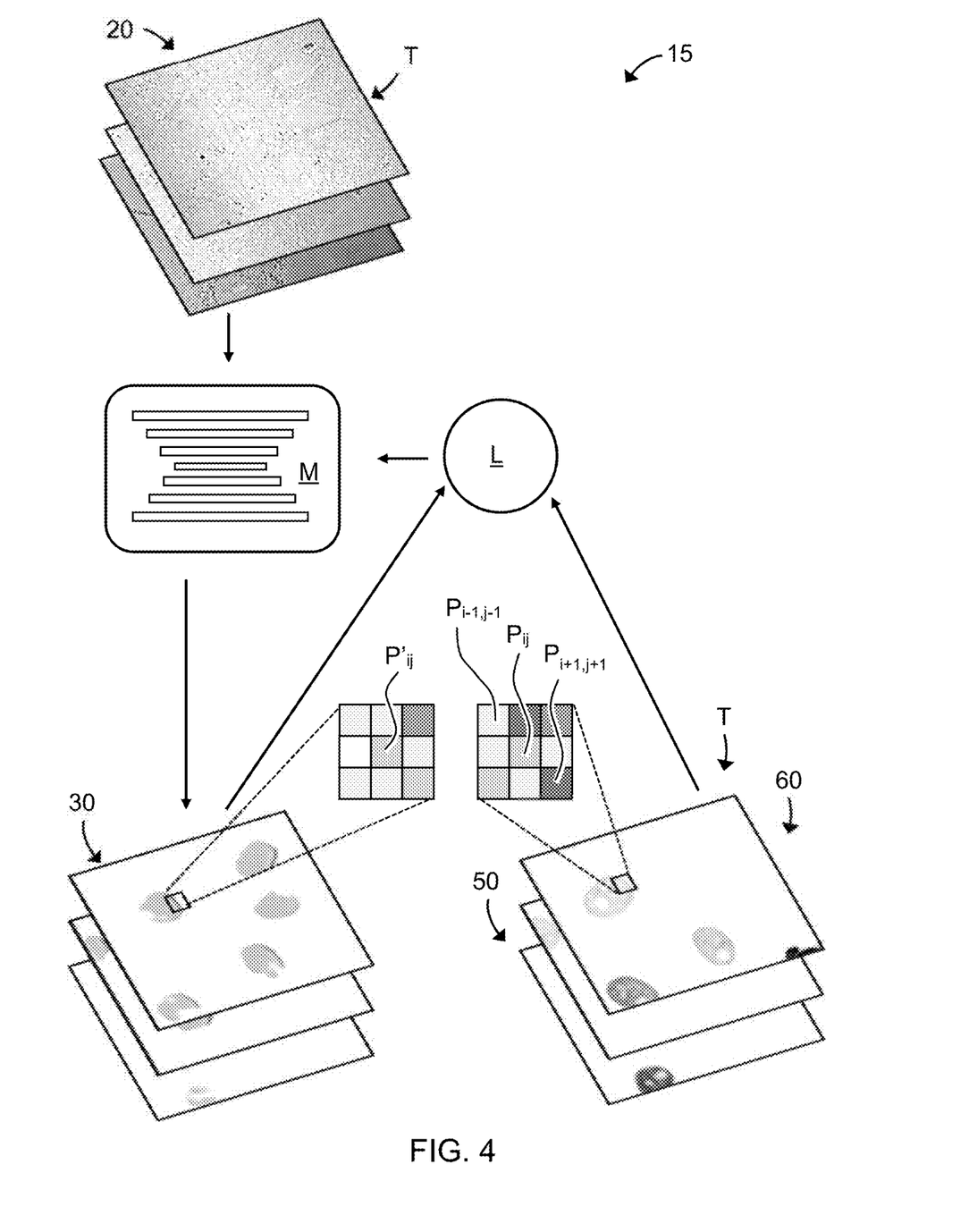
FIG. 4 shows schematically processes of a further example embodiment of a method of the invention.

FIG. 4

FIG. 4 illustrates a further example embodiment of a method according to the invention for training an image processing model M that can calculate a stylized contrast image 30 from a microscope image 20.

A plurality of microscope images 20 and associated captured contrast images 60 are provided for the training 15, as described for the preceding example embodiment. Here, however, the captured contrast images 60 are used directly as training data T and are not converted to detail-reduced contrast images. A detail reduction is instead achieved by means of a special design of the objective function or loss function L.

Usually, a loss function considers differences between locationally corresponding pixels $P_{ij}$ und $P'_{ij}$ of an image predicted by the model and a predetermined target image. A difference d is accordingly $d=(P_{ij}-P'_{ij})$, wherein i and j indicate a column and row in the images. For example, the sum of squares of the differences of all locationally corresponding pixels can enter a loss function.

In the present loss function L, blurring or a lack of definition is obtained by means of a modified loss function L. For the purposes of illustration, pixels of a stylized contrast image 30 calculated by the image processing model M and an associated captured contrast image 60 are shown in the form of enlarged sections. The loss function L does not only take into account a difference of the pixel $P'_{ij}$ of the stylized contrast image 30 from the locationally corresponding pixel $P_{ij}$ of the captured contrast image 60, but rather also takes into account differences of the pixel $P'_{ij}$ from pixels adjacent to the pixel $P_{ij}$, in particular differences from the pixels $P_{i-1,j-1}$ to $P_{i+1,j+1}$ illustrated by way of example. Model values of the image processing model M are consequently iteratively adjusted in such a manner that generated images do not correspond, for example, to the contrast images 60 provided, but rather to detail-reduced, blurred image variants. In addition or alternatively to such a blurring, a quantization of the $P_{ij}$ can occur in the loss function L. Stylized contrast images like the ones shown in the previous figure can be calculated by means of quantization.

The variants of FIG. 3 or FIG. 4 employ training data T with locationally registered microscope images and contrast images. An example embodiment that employs unregistered images is described in relation to the following figure.

Figure 5:
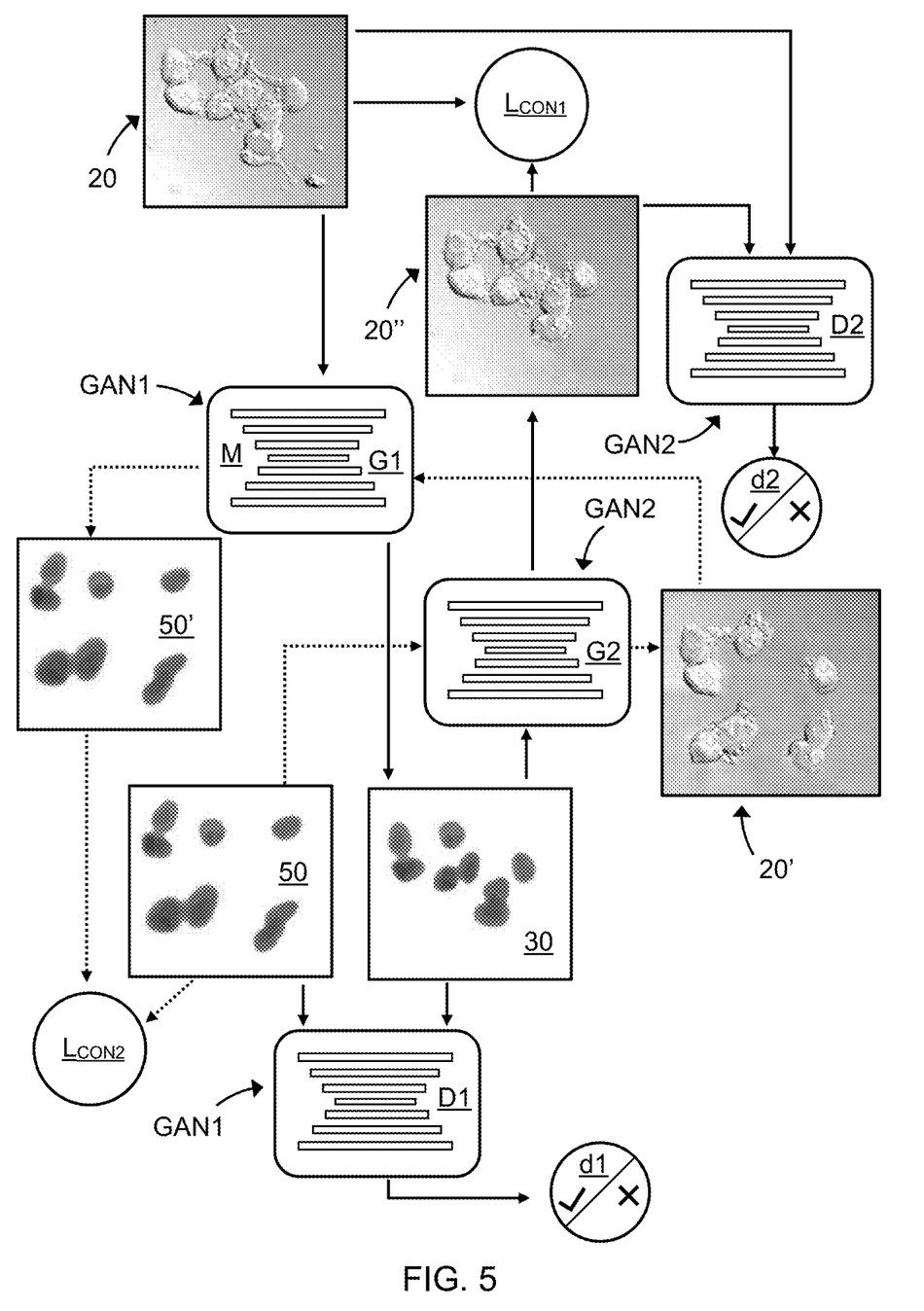
FIG. 5 shows schematically processes of a further example embodiment of a method of the invention.

FIG. 5

FIG. 5 illustrates a further variant embodiment of a method according to the invention for training an image processing model M that can calculate a stylized contrast image 30 from a microscope image 20.

A plurality of microscope images 20 and contrast images 50 are provided for the training, respective examples of which being shown in FIG. 5. The contrast images 50 are detail-reduced contrast images, which do not have to be locationally registered in relation to the microscope images 20. The contrast images 50 can also be captured using different samples than the microscope images 20.

Two conditional generative adversarial networks GAN1 and GAN2 are used to train the image processing model M. GAN1 and GAN2 respectively comprise a generator G1, G2 and a discriminator D1, D2.

The image processing model M is the generator G1 of GAN1 and can also be called the contrast image generator G1. The discriminator D1 (contrast image discriminator D1) of GAN1 receives either a stylized contrast image 30 generated by the generator G1 or an originally provided contrast image 50 as input. An output of the discriminator D1 constitutes a discrimination result d1 and indicates whether an input image was classified as a stylized contrast image 30 or as a contrast image 50.

The generator G2 can also be called a microscope image generator G2 and calculates an output image intended to correspond to a microscope image from an input image. As illustrated, the stylized contrast image 30 is input into the generator G2, which calculates a reconstructed microscope image 20" therefrom. The discriminator D2 receives the reconstructed microscope image 20" or the (originally provided) microscope image 20 as input and calculates an output therefrom, which is a discrimination result d2 indicating whether an input image was classified as a microscope image 20 or as a reconstructed microscope image 20".

Both GANs are trained simultaneously. This allows the generator G1 to learn to calculate, from an input microscope image 20, an image which appears to come from a statistical distribution of the originally provided contrast images 50. However, not just any image which appears to come from the statistical distribution of the originally provided contrast images 50 is to be calculated from an input microscope image 20, but an image whose content is consistent with the content of the input microscope image 20. This is achieved by forcing a cycle consistency. To this end, the microscope image 20 is compared with the reconstructed microscope image 20" that was generated from the microscope image 20 via the generator G1 and the generator G2. An objective function or loss function, hereinafter first consistency function $L_{CON1}$, captures differences between the microscope image 20 and the associated reconstructed microscope image 20", e.g., via a sum of squares of pixelwise differences. In an analogous manner, an objective function or loss function, hereinafter second consistency function $L_{CON2}$, can capture differences between a contrast image 50 and an associated contrast image 50', which is calculated by the calculation of a microscope image 20' from the contrast image 50 by the generator G2 and the subsequent calculation of the contrast image 50' from the microscope image 20' by the generator G1. An adjustment of the model parameters of the generators G1 and G2 can be determined from the consistency functions $L_{CON1}$ and $L_{CON2}$ via gradient descent so that the consistency functions $L_{CON1}$ and $L_{CON2}$ can be optimized/minimized iteratively.

In the training, the objective functions of both GAN1 and GAN2 are optimized together with the consistency functions $L_{CON1}$ and $L_{CON2}$. It is thereby possible, among other things, for the generator G1 to calculate a contrast image 30 from an input microscope image 20, wherein the content of the contrast image 30 (e.g. number, shape, size, location and brightness of depicted samples or sample structures) corresponds to the content of the input microscope image 20. The training does not require pairs consisting of a microscope image and a contrast image of the same sample.

In variants of the illustrated embodiment, one of the two consistency functions $L_{CON1}$ and $L_{CON2}$ can also be used alone. In further variants, a reduced level of detail can be taken into account in the consistency function $L_{CON1}$ and/or $L_{CON2}$ and/or the discriminator D2: since a stylized contrast image 30 contains less information than an associated microscope image 20 in terms of structural detail and a background, it can occur in certain circumstances that the discriminator D2 captures a statistical difference between microscope images 20 and reconstructed microscope images 20". In the consistency function $L_{CON1}$, in the absence of further measures, an optimal match would mean that the stylization carried out as an intermediate step does not involve a loss of information. It follows that, before it is run through the consistency function $L_{CON1}$ and/or the discriminator D2, the microscope image 20 can be manipulated in the same way as a captured contrast image for the generation of a detail-reduced contrast image, e.g. by reducing or quantising an image sharpness. These operations can also occur in the consistency function $L_{CON1}$ and/or the objective function (the adversarial loss) of the discriminator D2.

Figure 6:
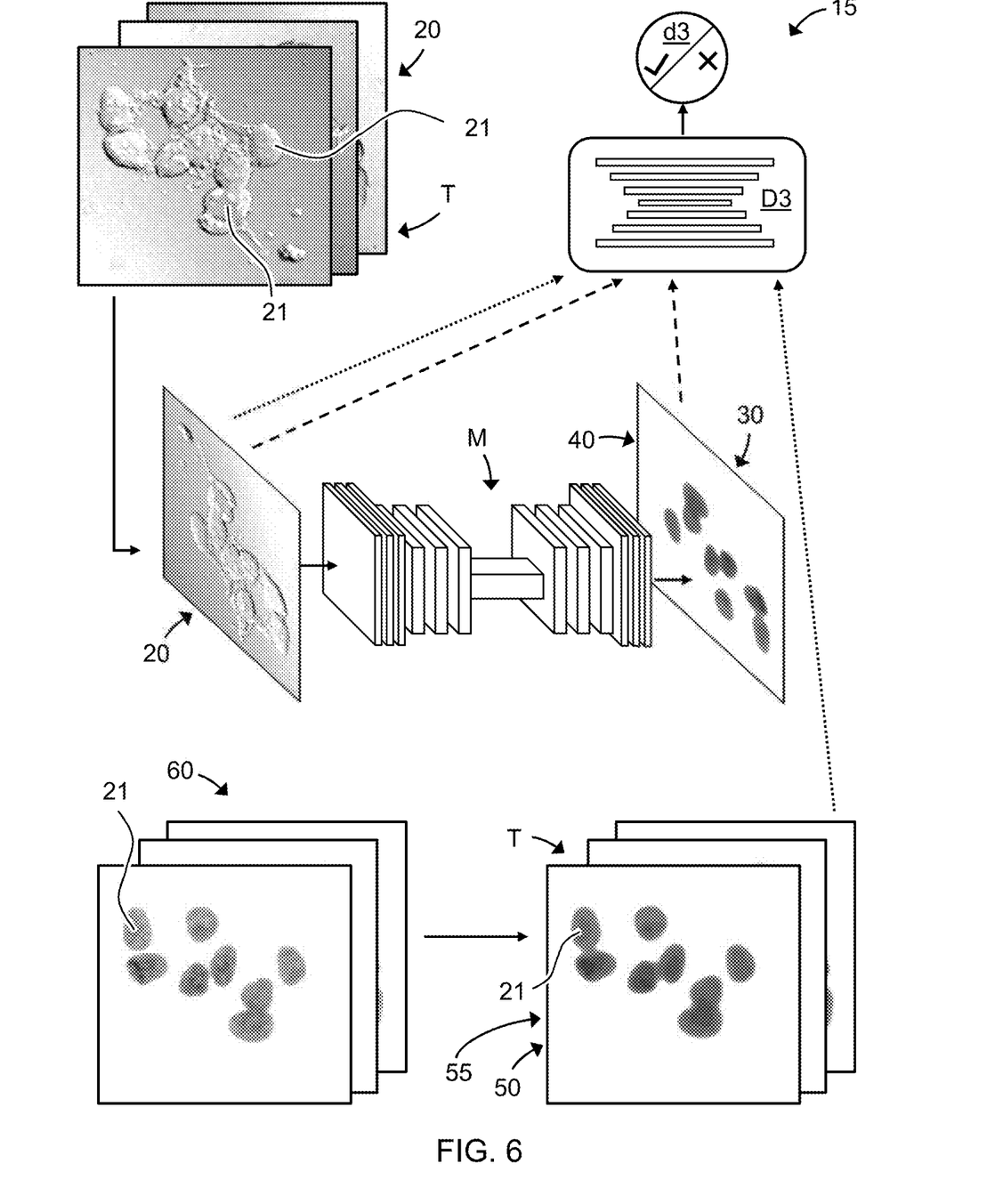
FIG. 6 shows schematically processes of a further example embodiment of a method of the invention.

FIG. 6

FIG. 6 illustrates a further example embodiment of a method according to the invention for training an image processing model M that can calculate a stylized contrast image 30 from a microscope image 20. The illustrated embodiment is a variant of the example illustrated in FIG. 3 with the addition of an adversarial loss. A cGAN is thus provided (cGAN: conditional generative adversarial network).

The image processing model M is constituted by a generator that is trained together with a discriminator D3. The discriminator D3 receives an image pair as input, namely either a microscope image 20 together with the associated detail-reduced contrast image 55 (dotted lines in FIG. 6) or the microscope image 20 together with the associated stylized contrast image 30 (dashed lines in FIG. 6). The discriminator D3 outputs a discrimination result d3 indicating whether the discriminator D3 classifies the entered image pair as an image pair with a detail-reduced contrast image 55 or with a stylized contrast image 30. In the objective function of the discriminator D3, a correct classification is rewarded and an incorrect classification is penalized. The objective function of the discriminator D3 is optimized to ideally always perform correct classifications. The objective function of the image processing model M comprises the objective function of the discriminator D3 and is optimized to deceive the discriminator D3. An architecture of the image processing model M can be, e.g., a U-Net or another type of CNN.

Figure 7:
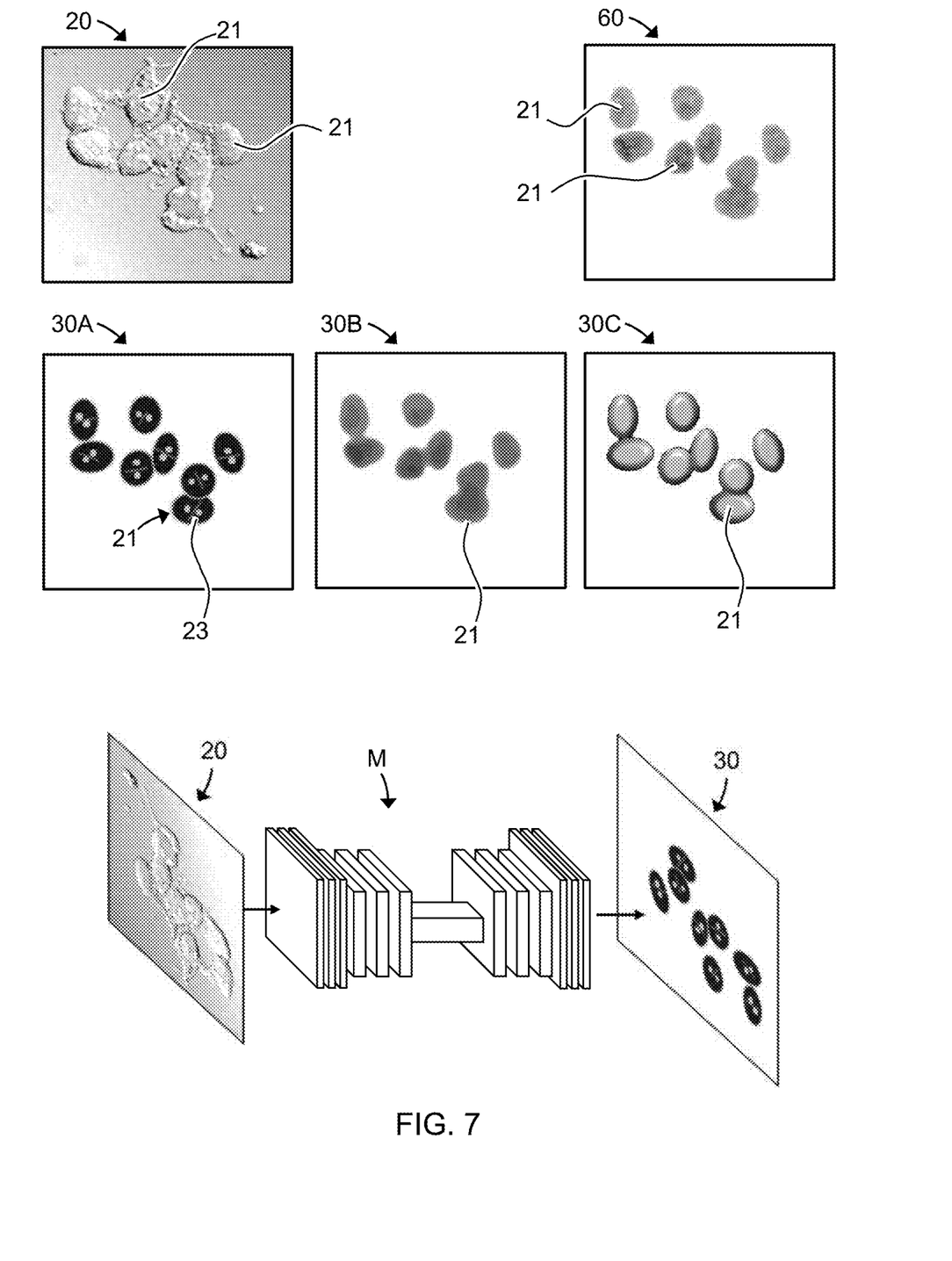
FIG. 7 shows schematically aspects of a further example embodiment of a method of the invention.

FIG. 7

FIG. 7 illustrates that different types of representation are possible for stylized contrast images.

The figure shows a microscope image 20, an associated captured contrast image 60, and three associated stylized contrast images 30A, 30B and 30C calculated in different manners. In the stylized contrast image 30A, substructures 23 within a sample structure 21 are also indicated, although in a symbolic representation. For example, a rough location and a number of certain cell organelles can be indicated.

The stylized contrast image 30C was calculated by a render program from geometric information. In this case, the image processing model M does not output the stylized contrast image 30C directly; instead, it outputs output data defining the stylized contrast image 30C which are input into the render program, which calculates an image with a 3D effect therefrom.

Upon completion of the training, the image processing model M can calculate a stylized contrast image 30 from a microscope image 20 that was not part of the training data, as illustrated in the lower section of FIG. 7.

In a variant of this embodiment, the image processing model M is trained to generate different stylizations or levels of detail of a stylized contrast image, e.g. corresponding to the stylized contrast images 30A-30C. By inference, a desired selection of an image style is entered together with a microscope image 20 to be processed, whereupon the image processing model M calculates one of the stylized contrast images 30A-30C according to the selection, optionally by means of the cited render program.

The variants described in relation to the different figures can be combined with one another. The described example embodiments are purely illustrative and variants of the same are possible within the scope of the attached claims.

| List of reference signs | |
| --- | --- |
| 1 | Microscope |
| 2 | Stand |
| 3 | Objective revolver |
| 4 | (Microscope) objective |
| 5 | Illumination device |
| 6 | Sample stage |
| 7 | Sample carrier |
| 8 | Microscope camera |
| 9 | Overview camera |
| 9A | Field of view of the overview camera |
| 9B | Mirror |
| 10 | Computing device |
| 11 | Computer program |
| 12 | Touchscreen |
| 15 | Training |
| 20 | Microscope image |
| 20' | Microscope image calculated by the generator of a GAN |
| 20" | Reconstructed microscope image calculated by the generators of two GANs |
| 20A | Input microscope image |
| 21 | Sample structures |
| 22 | Invented sample details added by a machine-learned model |
| 23 | Substructures within a sample structure 21 |
| 30, 30A-30C | Stylized contrast images |
| 40 | Output data defining a stylized contrast image 30 |
| 50 | Contrast image |
| 50' | Reconstructed contrast image calculated by the generators of two GANs |
| 55 | Detail-reduced contrast image |
| 60 | Captured contrast image |
| 70, 70A | Calculated contrast image/virtually stained image |
| 100 | Microscopy system |
| D1 | Contrast image discriminator |
| D2 | Microscope image discriminator |
| D3 | Discriminator of a cGAN |
| d1, d2, d3 | Discrimination results |
| G1 | Contrast image generator |
| G2 | Microscope image generator |
| GAN1 | (First) generative adversarial network |
| GAN2 | Second generative adversarial network |
| L | Objective function/loss function |
| $L_{CON1}$ | First consistency function |
| $L_{CON2}$ | Second consistency function |
| M | Image processing model |
| M' | Conventional model for virtually staining an image |
| $P'_{ij}, P_{ij}, P_{i-1,j-i}, P_{i+1,j+1}$ | Pixels |
| T | Training data for learning the image processing model M |
| T' | Training data of a conventional model M' |

What is claimed is:

1. A computer-implemented method for generating an image processing model that generates output data defining a stylized contrast image from a microscope image, comprising:
   adjusting model parameters of the image processing model by optimizing at least one objective function using training data comprising microscope images as input data and contrast images, wherein the microscope images and the contrast images are generated by different microscopy techniques,
   in order for the output data to define a stylized contrast image, the objective function forces a detail reduction or the contrast images are detail-reduced contrast images with a level of detail that is lower than in the microscope images and higher than in binary images.

2. The computer-implemented method according to claim 1,
   wherein the objective function forces the detail reduction by describing a lack of image definition or a blurring of adjacent pixels of a contrast image or by quantizing values of pixels of the contrast images.

3. The computer-implemented method according to claim 1,
   wherein the detail-reduced contrast images are generated using a detail reduction of captured contrast images, by carrying out an image definition reduction of the captured contrast images, by reducing a color depth, or by performing a smoothing of shape contours in the captured contrast images.

4. The computer-implemented method according to claim 1,
   wherein a quantization of brightness values is carried out for the purposes of detail reduction, wherein quantization levels are predetermined or defined automatically using an assessment of one or more of the contrast images.

5. The computer-implemented method according to claim 1,
   wherein the detail-reduced contrast images are formed using captured contrast images, at least one image-style example image, and a style transfer algorithm,
   wherein the image-style example image has a lower level of detail than the captured contrast images, and wherein the style transfer algorithm calculates one of the reduced detail contrast images from one of the captured contrast images and the image-style example image.

6. The computer-implemented method according to claim 1,
   wherein the detail-reduced contrast images are blurred or captured with a lower color depth compared to microscope images.

7. The computer-implemented method according to claim 1,
   wherein an output of the image processing model indicates a certainty of a model prediction of the image processing model,
   wherein the image processing model or a subsequent program is designed to carry out a more extensive detail reduction in the output data defining a stylized contrast image, the lower the certainty of the model prediction.

8. The computer-implemented method according to claim 7,
   wherein the certainty of the model prediction is indicated pixelwise or by image area, and
   wherein the image processing model or a subsequent program is designed to carry out a detail reduction in the output data defining a stylized contrast image pixelwise or by image area depending on the certainty of the model prediction indicated for corresponding pixels or image areas.

9. The computer-implemented method according to claim 1,
   wherein the image processing model is trained to implement a selectable level of detail reduction.

10. The computer-implemented method according to claim 1,
    wherein the training data comprise respective sets of a plurality of vertically staggered contrast images of a same sample, and
    wherein the image processing model is trained to calculate output data defining a plurality of vertically staggered stylized contrast images or a stylized 3D model from a single input microscope image.

11. The computer-implemented method according to claim 1,
    wherein at least some of the microscope images and contrast images of the training data are not registered;
    wherein the image processing model is constituted by a contrast image generator of a generative adversarial network, which also comprises a contrast image discriminator trained to discriminate whether an input image is a contrast image or a stylized contrast image generated by the image processing model;
    wherein the generative adversarial network is simultaneously trained with a second generative adversarial network comprising a microscope image generator and a microscope image discriminator;
    wherein the microscope image generator is trained to generate a reconstructed microscope image from a stylized contrast image, and wherein the microscope image discriminator is trained to discriminate whether an input image is a microscope image or a reconstructed microscope image;
    wherein a first consistency function which captures differences between a microscope image and an associated reconstructed microscope image is simultaneously optimized, wherein the reconstructed microscope image is generated by inputting the microscope image into the contrast image generator and inputting the thus created stylized contrast image into the microscope image generator; and
    wherein a second consistency function which captures differences between a contrast image and an associated reconstructed contrast image is simultaneously optimized, wherein the reconstructed contrast image is generated by inputting the contrast image into the microscope image generator and inputting a thus created microscope image into the contrast image generator.

12. A computer-implemented method for generating a stylized contrast image comprising:
    receiving a microscope image;
    calculating a stylized contrast image using the microscope image using an image processing model generated through the method as defined in claim 1.

13. A microscopy system with
    a microscope for image capture; and
    a computing device configured to execute the computer-implemented method according to claim 1.

14. A computer program stored on a non-transitory computer-readable medium, comprising commands which, when the program is executed by a computer, cause the execution of the method according to claim 1.

\* \* \* \* \*